(12) United States Patent
Jones et al.

(10) Patent No.: US 10,300,896 B2
(45) Date of Patent: May 28, 2019

(54) BRAKE SYSTEM FOR AIRCRAFT

(71) Applicant: Textron Aviation Inc., Wichita, KS (US)

(72) Inventors: Darrin Michael Jones, Rose Hill, KS (US); Michael Troy Heeren, Wichita, KS (US); Dennis Stephen Bradfield, Wichita, KS (US)

(73) Assignee: Textron Innovations, Inc., Providence, RI (US)

( * ) Notice: Subject to any disclaimer, the term of this patent is extended or adjusted under 35 U.S.C. 154(b) by 0 days.

(21) Appl. No.: 15/479,512

(22) Filed: Apr. 5, 2017

(65) Prior Publication Data

US 2018/0099650 A1 Apr. 12, 2018

Related U.S. Application Data

(60) Provisional application No. 62/406,035, filed on Oct. 10, 2016.

(51) Int. Cl.
| | |
|---|---|
| *B60T 8/88* | (2006.01) |
| *B60T 8/17* | (2006.01) |
| *B60T 7/12* | (2006.01) |
| *B60T 7/04* | (2006.01) |
| *B60T 13/74* | (2006.01) |
| *B60T 8/00* | (2006.01) |
| *B60T 13/66* | (2006.01) |
| *B60T 17/18* | (2006.01) |
| *B60T 8/32* | (2006.01) |

(52) U.S. Cl.
CPC ............ *B60T 8/1703* (2013.01); *B60T 7/042* (2013.01); *B60T 7/12* (2013.01); *B60T 8/00* (2013.01); *B60T 8/321* (2013.01); *B60T 8/325* (2013.01); *B60T 8/885* (2013.01); *B60T 13/662* (2013.01); *B60T 13/745* (2013.01); *B60T 17/18* (2013.01); *B60T 2270/402* (2013.01); *B60T 2270/403* (2013.01); *B60T 2270/404* (2013.01); *B60T 2270/413* (2013.01); *B60T 2270/82* (2013.01)

(58) Field of Classification Search
CPC .......... F16D 65/847; B60T 7/06; B60T 7/042; B60T 8/1703
USPC ..... 188/71.5, 71.6, 156–165; 303/3, 122.09; 244/110 A, 111
See application file for complete search history.

(56) References Cited

U.S. PATENT DOCUMENTS

| | | | | |
|---|---|---|---|---|
| 4,792,192 | A * | 12/1988 | Tveitane | B60T 8/325 188/151 A |
| 6,513,885 | B1 * | 2/2003 | Salamat | B60T 8/1703 303/122.09 |
| 6,820,946 | B2 * | 11/2004 | Salamat | B60T 8/1703 303/122.09 |
| 2005/0189814 | A1 * | 9/2005 | Mallevais | B60T 8/1703 303/3 |
| 2008/0154470 | A1 | 6/2008 | Goranson et al. | |

(Continued)

*Primary Examiner* — Christopher P Schwartz
(74) *Attorney, Agent, or Firm* — Erise IP, P.A.

(57) ABSTRACT

Disclosed is a brake system for aircraft that uses a control unit that is configured to control actuators at each wheel using one channel operating an associated brake control module, and other actuators at the same wheel using a second module operated completely independently using a second module. The use of the first and second groups of actuators are alternated periodically, e.g., for each flight.

14 Claims, 3 Drawing Sheets

(56) References Cited

U.S. PATENT DOCUMENTS

| | | | | |
|---|---|---|---|---|
| 2008/0258547 A1* | 10/2008 | Ralea | .................... | B60T 8/1703 |
| | | | | 303/122 |
| 2010/0106347 A1* | 4/2010 | Cahill | ................... | B60T 8/1703 |
| | | | | 701/3 |
| 2011/0040466 A1* | 2/2011 | Hill | ..................... | B60T 8/1703 |
| | | | | 701/74 |
| 2011/0100769 A1* | 5/2011 | Frank | ................... | B60T 8/1703 |
| | | | | 188/106 R |
| 2013/0175403 A1* | 7/2013 | Spray | ................... | B60T 8/1703 |
| | | | | 244/235 |
| 2013/0253736 A1* | 9/2013 | Frank | ................... | B64C 25/426 |
| | | | | 701/3 |
| 2015/0129368 A1* | 5/2015 | Cahill | ................... | B60T 8/1703 |
| | | | | 188/71.5 |
| 2015/0151728 A1* | 6/2015 | Iordanidis | ................ | B60T 8/17 |
| | | | | 701/3 |
| 2015/0291279 A1* | 10/2015 | Iordanidis | ............ | B60T 8/1703 |
| | | | | 188/156 |
| 2015/0291280 A1* | 10/2015 | Iordanidis et al. | ..... | B64C 25/44 |
| 2016/0318492 A1* | 11/2016 | Miller | ................... | B60T 8/1703 |
| 2017/0144750 A1* | 5/2017 | Cahill | ................... | B64C 25/48 |

* cited by examiner

BRAKE SYSTEM FOR AIRCRAFT

CROSS-REFERENCE TO RELATED APPLICATIONS

This application claims the benefit of U.S. Provisional Patent Application No. 62/406,035 filed Oct. 10, 2016, the entire contents of which are hereby incorporated by reference.

BACKGROUND OF THE INVENTION

1. Field of the Invention

The invention relates generally to the field of brake systems for aircraft. More specifically, the invention relates to the establishment of redundancy in aircraft brake systems.

2. Description of the Related Art

Historically, aircraft braking systems initially involved the use of a brake pedal in the cockpit of an aircraft, and a mechanical system being directly linked between the pedal, and the brakes at the aircraft wheels. Some more-modern systems include a fly-by-wire arrangement. Fly-by-wire braking systems use positional sensors to determine the position of the brake pedal, and then apply or release the brakes based on sensed pedal position.

Most modern aircraft also include one or more brake modules that receive the sensed pedal information, and use a valved hydraulic system to introduce fluid pressure into chambers at each brake to activate each brake. Information received by the modules from pressure sensors near each brake is used to make sure that appropriate brake pressure to be applied hydraulically in a uniform fashion.

Dual-channel brake control systems are common in the industry. These systems, however, include dual-channel arrangements. More specifically, the controller is divided such that each channel controls one half of the brakes independently. Thus, both control channels are always active during normal operation. In these systems, if one channel fails, then only one half of the brakes remain available.

A dual chamber brake is also currently used in industry. But with these systems, the dual chamber brake is divided such that one half of the brake pistons are controlled by one brake system and the remaining half by another brake system. Both brake systems and therefore all the brake pistons are used during normal operation. And if one of the two brake systems fail, then only one half of the brake pistons are used. Normal stopping performance requires all the brake pistons to be operational. Thus, the failure will result in less stopping power.

SUMMARY

In embodiments, a brake system is revealed which uses a control unit. The unit, in embodiments, uses first and second communications channels. One channel controls a first brake system existing at each wheel, and a second channel controls a second brake system at the same wheel.

In embodiments, the control unit is operable in a first mode where the first channel applies the wheel brakes during an event, a flight, and the second channel and brake system are not operated, but instead in standby mode for that flight. The control unit, between events, causes the second channel of communications to become active and to control the second brake system for a next event, e.g., flight.

In embodiments, the control unit causes continual alternation between: (i) the first channel of communications operating the first brake system; and (ii) the second channel of communications operating the second brake system. In some embodiments, the switching occurs after a landing and before a takeoff.

Mechanically speaking, in embodiments, a first group of pistons are clocked about each brake, and a second group of pistons are intermittently dispersed relative to the pistons of the first group.

In another embodiment, the brake system has a brake control unit that is adapted to receive pilot input signals and administer first-flight-event braking commands via a first channel to a first brake control module. The first brake control module, upon receiving the first-flight-event braking commands, controls braking forces to a first set of actuators onto a first wheel during or about the time of a first flight event, and after that event, the unit is configured to switch to a second channel to administer a second-flight-event braking commands to a second brake system using a second brake control module, the second brake control module, upon receiving the commands, causing a second set of actuators to apply varying degrees of braking forces onto the first wheel during or about the time of a second flight event.

Embodiments can also be expressed as a process. The process can be executed on an aircraft where the brake system has a brake control unit that is configured to control a first group of actuators at each wheel brake using a first brake control module operating according to signals transmitted by a first channel of the control unit, and control a second group of actuators at each wheel brake using signals transmitted by a second channel of said control unit. The process involves periodically alternating between the use of the first group of actuators and the second group of actuators between, e.g., flights.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide systems and a method for providing a braking system for an aircraft that also presents the redundancy required. In one embodiment, a first channel which utilized a first group actuators, e.g., pistons, drums or other forms of applying brake pressure, existing at each and all the brakes is active for one flight (or, one braking event), while a second "standby" channel, which is associated with a second group of pistons existing at each and every brake is used alternately for the next flight (or braking event). Thus, only one control channel is in operation, or "active" at a time. If a channel fails, all brakes are still available using the remaining control channel.

Therefore, unlike with conventional systems, the brake-system embodiments disclosed herein use only one half of the brake pistons for normal stopping performance. The active brake pistons alternate as the brake control channel alternates. If a channel fails, normal stopping performance is available using the remaining control channel. This is superior to the prior art arrangements which, although do provide some redundancy, will experience a reduction in braking power when a failure occurs.

Figure 1:
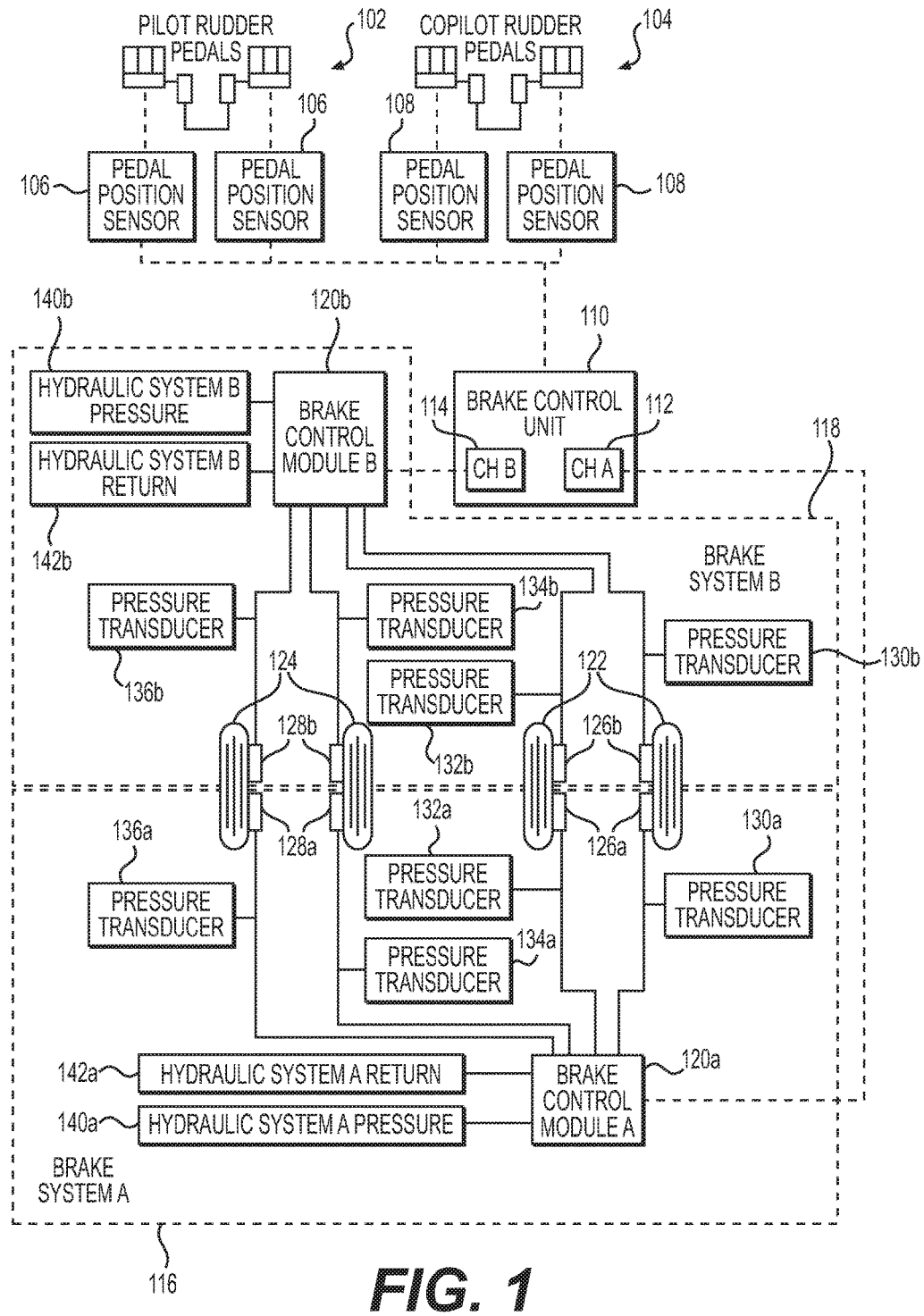
FIG. 1 is a schematic showing an embodiment of the brake system.

One embodiment for a disclosed system is shown in FIG. 1. Referring to the figure, an overall system 100 includes a pair of pilot control pedals 102, as well as a pair of copilot control pedals 104. The positions of each of pedal pairs 102 and 104 are sensed by each of dual channel position-determining sensors 106 and 108, respectively. Those familiar with fly-by-wire brake systems will know that the brake control unit 110 receives signals from the sensors 106 and 108, as well as signals received from dual channel wheel-speed transducers (not shown, but are internal to each wheel axle on the landing gear) as well as pressure readings received from the plurality of pressure transducers 130a, 130b, 132a, and 132b associated with wheel set 122; 134a, 134b, 136a, and 136b associated with wheel set 124; and are then received into the brake control unit which converts the information received into further signals (in the form of voltage outputs) that operate the brake control valves (in each of modules 120a and 120b) to apply or release pressure to the brakes based on the sensed pedal information. Module 120a receives pressurized hydraulic fluid from a source 140a, and releases pressurized fluid from the system via return 142a. Similarly, module 120b receives pressurized hydraulic fluid from a source 140b, and releases pressurized fluid from the system via return 142b.

The brake control unit 110, in the disclosed embodiment, is broken into two independent channels 112, and 114. A first channel, noted as channel "A" of the unit, is used to control a brake system "A" 116 which is totally independent from a separate brake system "B" 118. As will be discussed hereinafter in more detail, systems A and B are used alternately. When channel A is in active mode, signals transmitted on channel A 112 are representative of the information received from either the pilot or copilot pedal position sensors (106 or 108), and when received by a brake control module 120a, cause the manipulation of brake control valves that modulate hydraulic pressure to the desired level. The pressure is used to control the mechanical brake pressure at the right main landing gear wheels 122 and the left main landing gear wheels 124 as shown. More specifically, module 120a administers hydraulic fluid under pressure into: a first group of pistons 126a in the wheel arrangements on the right, as well as a first group of pistons 128a in the left wheel arrangement.

While brake channel A is in active mode, a second channel, noted as channel "B" of the unit, is in standby mode until the processes operating on brake control unit 110 cause a switch. This could happen in the event of some failure in system A, or in the event a new braking event is set to occur (e.g., if the plane has landed, and is set for a new flight).

Brake system "B" 118 is totally independent from system A. Signals transmitted from the second channel B 114 are representative of the information received from either the pilot or copilot pedal position sensors (106 or 108), and when received by a brake control module 120b will be used to control the brake pressure in: a second group of pistons 126b in the wheel arrangements 122 on the right, as well as a first group of pistons 128b in the left wheel arrangement 124.

Figure 2:
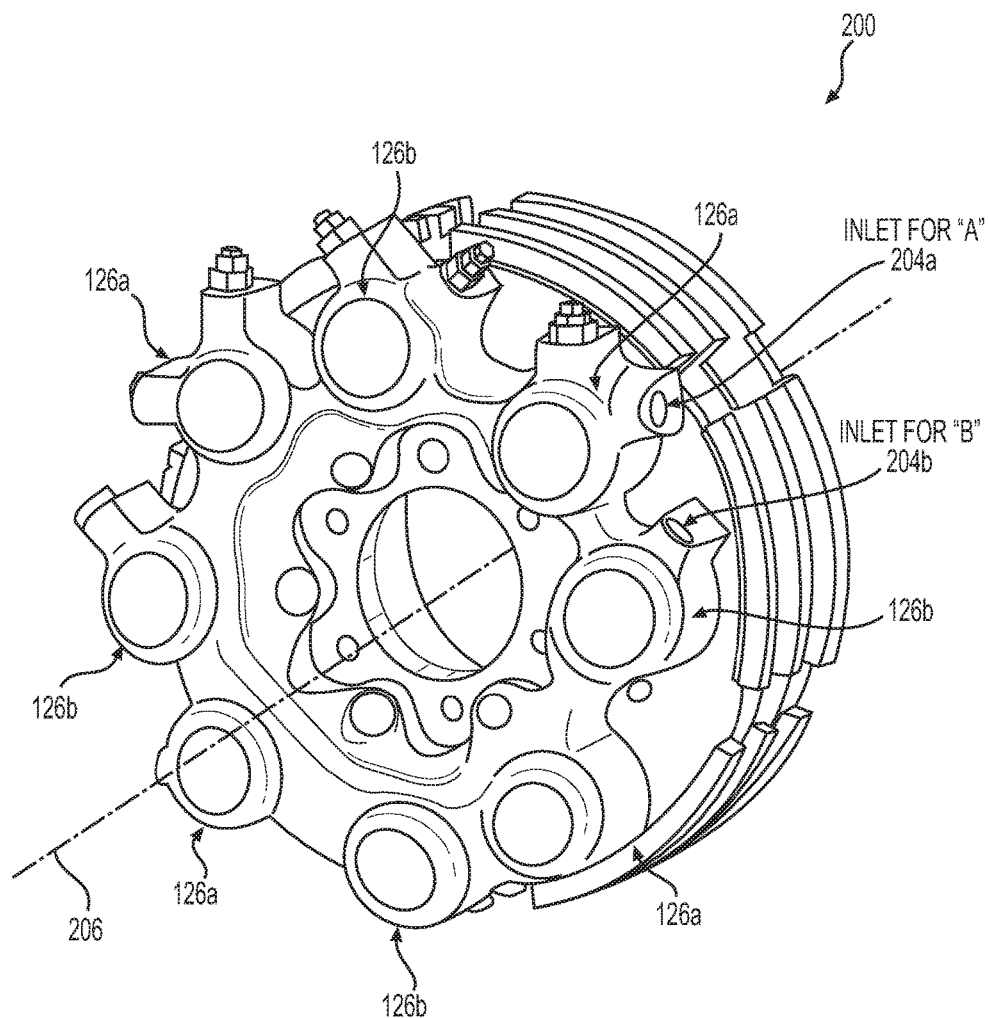
FIG. 2 is a perspective view of an embodiment of the hydraulic equipment at the wheel brake in an embodiment.

It should be noted that the schematic depictions in FIG. 1 of the grouped piston arrangements 126a, 126b, 128a, and 128b are not physically accurate. The physical arrangement 200 for a brake assembly at a wheel, in an embodiment, would look as shown in FIG. 2. Thus, it should be understood that the FIG. 2 arrangement (or other embodiments), could exist at each of the four wheels shown on the right gear 122 and the left gear 124.

Referencing FIG. 2 it can be seen that mechanical brake arrangement 200 includes the first group of pistons 126a. Although not shown, each of the pistons in group 126a are fluidly connected via concealed conduits. The pistons are arranged to apply pressure to the brakes, and are substantially equidistant from the center axis 206 of the wheel (wheel is not shown). Also, each of the pistons in the group are clocked and/or spaced apart relative to one another in a way that causes equal even distribution of braking force when all of the pistons in the group 126a are active. Hydraulic fluid is pushed to the piston group 126a through an inlet 204a as controlled by brake control module 120a (see FIG. 1) in response to signals received from channel A 112 of the brake control unit 110.

Referring back to FIG. 2, a second inlet 204b is used to deliver hydraulic fluid to a second group of pistons 126b. Again, like with group 126a, each of the pistons in group 126b are fluidly connected via concealed conduits. The hydraulic fluid system serving group 126b is completely hydraulically separate from the system serving group 126a and will not be actuated at the same time as will be discussed hereinafter. Each of the pistons in the group 126b are clocked intermittently relative to those in group 126a. Thus, when either of groups 126a or 126b are activated at different times, they will result in even distribution of braking force. But group 126b is operated completely independently from the pistons in group 126a. Additionally, the pistons in group 126b are served by the completely separate systems comprising brake control module 120b (see FIG. 1) in response to signals received from channel B 114 of the brake control unit 110.

Figure 3:
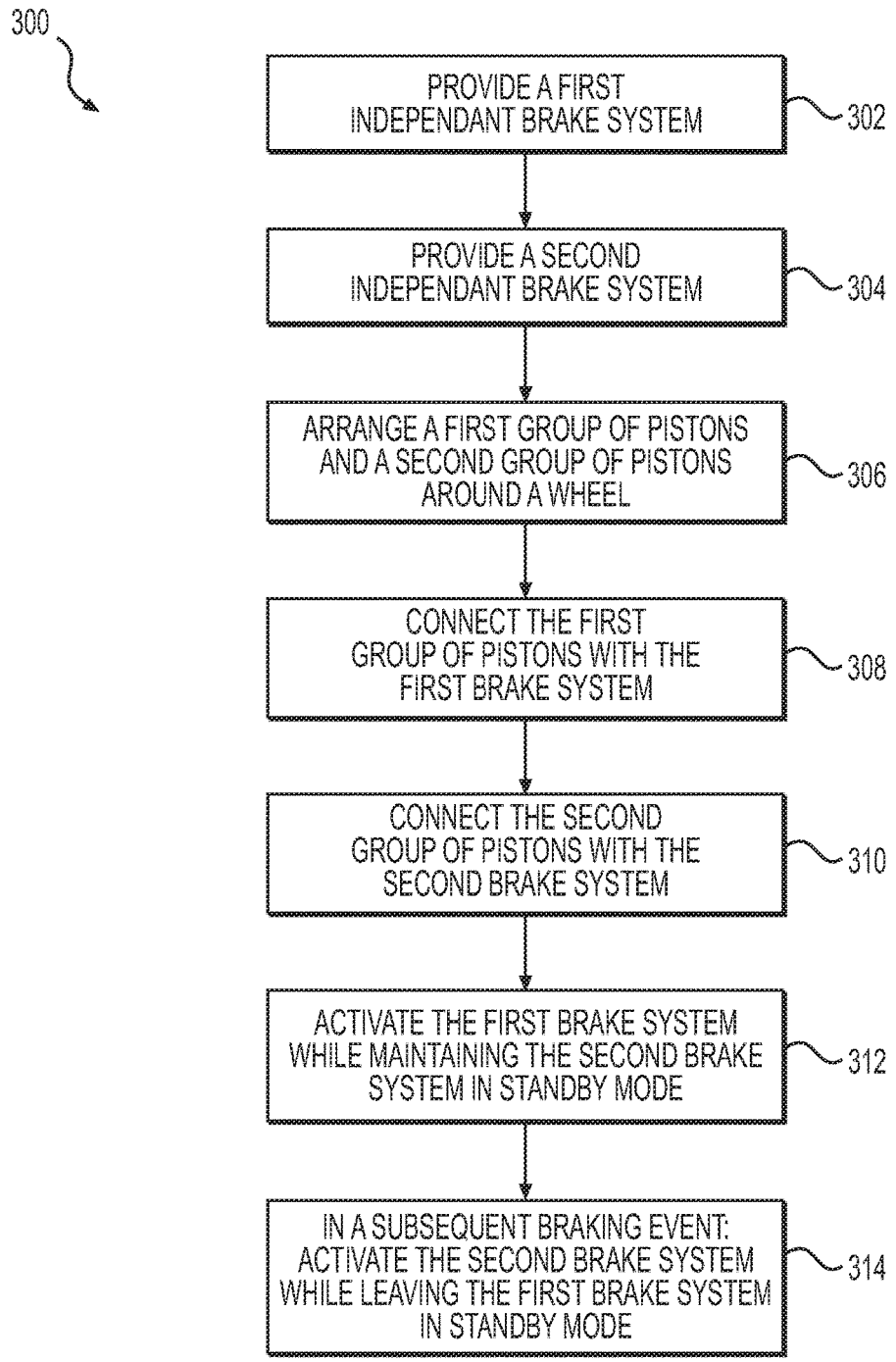
FIG. 3 is a flow diagram showing the steps involved in the execution of one embodiment of the disclosed braking processes.

FIG. 3 depicts a flow diagram 300 illustrating steps existing in an embodiment of a process executable in the environment shown in FIG. 1 and incorporating the piston arrangement in FIG. 2.

In a first step 302, a first independent brake channel is provided, and then is a step 304, a second independent brake channel is provided. An example of such an arrangement is shown in FIG. 1 where a first brake system 116 is provided along with a second completely independent brake system 118. More specifically, FIG. 1 reveals that all the electronic, mechanical, as well as hydraulic equipment of system 116 all operate independently from the corresponding equipment in system 118.

In a next step 306, a first group of pistons (e.g., piston group 126a) and a second group of pistons (e.g., piston group 126b) are arranged around a wheel brake (see FIG. 2). Note that in the FIG. 2 embodiment the pistons from the first group 126a are clocked, and arranged alternately relatively to the clocked pistons in the second group 126b. In next step 308 the group of pistons with the first group (e.g., groups 126a and 128a) are connected with the first brake system (e.g., system 116), and in a step 310, the group of pistons with the second group (e.g., groups 126b and 128b) are connected with the second brake system (e.g., system 118).

A next step 312 relates to how the system, which has been set up as discussed in the steps above, is operated using the brake control unit 110. In an embodiment, the control unit (which is a programmable device having a memory and processing capabilities) for a first flight, designates channel A 112 as active. Channel A will cause brake system A 116 to remain active for a single braking event (e.g., one flight, one landing, etc.). During this time, only the pistons of groups 126*a* and 128*a* will be activated for braking purposes. Also during this first braking event, channel B 114 will keep all of the components in brake system B 118 in standby mode, and are not used, that is, unless a failure occurs in channel A. When there is a failure, the control unit 110 will cause channel B to be used, and thus brake system B 118 to be operated for the remainder of that flight. Ordinarily, however, channel A will remain active, and channel B will remain in standby mode for the entire flight event.

Once the initial braking event has been completed, (e.g., the aircraft is prepared for a next flight), braking system B 118 is activated by channel B 114, and braking system A 116 is placed in standby mode for the duration of the new braking event. For example, where the braking event is set to be the duration of the new flight, system A will remain completely dormant, and system B (along with piston groups 126*b* and 128*b*) will be used exclusively. Again here, in the event of a failure, channel A will be activated. But in normal circumstances, channel A will remain in sleep mode for the entire flight event.

For any subsequent flights, the processes running on the brake control unit alternately designate channels A and B between active and standby modes. Thus, only one system of brake systems A and B are used at a time, and only half of the pistons located at a particular wheel brake assembly are used at a time. Conventional arrangements that utilize backup components which only come into use upon a failure create system degradation disparity that is avoided by the system described herein.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A brake system for aircraft comprising:
a control unit having a first channel of communications controlling a first brake system existing at a wheel, and a second channel of communications controlling a second brake system existing at the wheel, the first brake system includes a first group of pistons existing at a set of first clocked positions about the wheel, and the second system includes a second group of pistons existing at a set of second clocked positions about the wheel;
the control unit operable in a first mode wherein: (i) the first channel of communications actively controls and operates the first group of pistons to selectively and substantially uniformly apply brake pressure at each of the first clocked positions to the wheel, and, (ii) the second channel of communications and the second brake system are placed on stand-by and not operated during the first mode unless a failure occurs in the first channel;
the control unit, after the completion of an event related to a first flight durational component, and for a second flight durational component, implements a second mode which: (i) causes the second channel of communications to become active and control the second group of pistons in selectively and uniformly apply brake pressure at each of the second clocked positions to the wheel , and (ii) places the first channel of communications and the first brake system into standby mode, such that the first brake system is not operated unless a failure occurs in the second channel.

2. The brake system of claim 1 wherein the control unit causes repeated alternation between the first and second modes in establishing a maintenance plan for the brake system.

3. The brake system of claim 2 wherein each alternation made by the control unit occurs on or about: a landing after a completed flight, or a takeoff at the beginning of a flight, and no alternation is made during a flight or between the completed flight and the beginning of a next flight.

4. The brake system of claim 1 wherein the first first group of pistons existing at substantially equal angularly spaced-apart locations about the wheel, and the second group of pistons also exist at substantially equal angularly spaced apart locations, and are intermittently dispersed relative to the pistons of the first group.

5. A brake system comprising:
a brake control unit;
the brake control unit adapted to receive pilot input signals and administering braking commands via a first channel to a first brake control module, the first brake control module, upon receiving the first-flight-event braking commands, controlling braking forces to a first set of actuators, the first set of actuators being substantially equally spaced apart onto a wheel brake during a first portion of a flight schedule; and
the brake control unit, after the first portion, being configured to switch to a second channel, the second channel administering braking commands to a second brake system using a second brake control module, the second brake control module causing a second set of actuators to apply varying degrees of braking forces onto the wheel brake during or about the time of a second portion of a flight schedule, the second set of actuators being substantially equally spaced apart and intermittently located within each of the actuators in the first set of actuators.

6. The brake system of claim 5 wherein the subset of the first set of actuators are all hydraulically connected by a first common conduit, and the equal number of actuators from the equal number of actuators from the second set are all hydraulically connected by a second common conduit.

7. The brake system of claim 5 wherein:
a second wheel brake is located in a symmetrically opposite location of an aircraft relative to the first wheel brake, and the second wheel brake has a second wheel actuator system that is substantially the same the actuator arrangement for the first wheel brake.

8. The brake system of claim 5 wherein the first and second sets of actuators all comprise pistons.

9. The brake system of claim 5 wherein the first and second intended flight events are separate flights of an aircraft.

10. A process for operating a brake system on an aircraft, the aircraft having a plurality of wheels, a brake control unit which is configured to receive braking commands from at least one pilot, and a plurality of actuators at each wheel brake in said plurality, the process comprising:
- controlling a first group of actuators at each wheel brake using a first brake control module operating according to signals transmitted by a first channel of the control unit, the first group of actuators being clocked about the brake at substantially equally spaced apart angular locations;
- controlling a second group of actuators at each wheel using signals transmitted by a second channel of said control unit, the second group being clocked about the brake at substantially equally spaced apart angular locations different from the locations of the first group;
- periodically alternating between the use of the first group of actuators and the second group of actuators according to a degradation disparity prevention routine, the alternating occurring according to a defined flight event term, and;
- a routine interruption process, the routine interruption process detecting a failure in whichever of the first and second group of actuators is currently operating, interrupting the routine, and operating the other group.

11. The process of claim 10 comprising:
locating actuators from the first group at spaced-apart positions about each of a plurality of wheels on the aircraft, and interposing one actuator from the second group between each actuator from the first group.

12. The process of claim 11 comprising:
establishing the routine based on the occurrence of one or more events related to a flight schedule.

13. The process of claim 12 comprising:
selecting the embarkment on a new flight as the event in establishing the routine for periodically alternating.

14. The process of claim 10, the interruption process further comprising:
- exiting the routine in the event of a failing system selected from one of: (i) a first system including the first channel and the first group, and (ii) a second system including the second channel and the second group;
- switching to the one of the first and second systems which is not the failing system.

* * * * *